United States Patent Office 3,321,451
Patented May 23, 1967

---

3,321,451
ADHESIVE COMPOSITIONS
Robert J. Gander, Whitehouse, N.J., assignor to Johnson & Johnson, a corporation of New Jersey
No Drawing. Filed July 2, 1965, Ser. No. 469,334
20 Claims. (Cl. 260—79.3)

This application is a continuation-in-part of application Ser. No. 313,441, filed Oct. 3, 1963.

The present invention is drawn to acrylate adhesive compositions and more particularly to acrylate adhesive compositions that can be removed by washing with water.

Acrylate adhesives, as the term is used in the present specifications, refers to adhesive acrylate compositions, wherein an ester of acrylic acid is polymerized, or copolymerized with various co-monomers containing a polymerizable ethylenic linkage. The acrylate adhesives include both those of the pressure-sensitive adhesive type which remain permanently tacky to the touch, as well as those adhesive compositions which are more in the nature of a cement, the same being solvent applied and being only slightly tacky or even non-tacky after evaporation of the solvent. Solvent applied, non-pressure-sensitive adhesives of this type, for example, are those where the adhesives in use is applied from a solvent which leaves an initially tacky film, which on evaporation of the solvent leaves a non-tacky polymer residue which cements itself to the skin and other objects it contacts in its initial tacky state.

Acrylate adhesives are particularly useful for adhesively applying or attaching articles to the skin, as the same are generally compounded of a single chemical individual instead of being compounded from a number of individual components, as, for example, are the conventional rubber-base pressure-sensitive adhesives. As a result, acrylate adhesives are potentially less irritating to the skin. Acrylate pressure-sensitive adhesives also have the further advantage that they can be made water-white and are extremely stable to influences of heat, light, and age when compared to the more conventional pressure-sensitive, rubber-base adhesives. They also have the further advantage of sticking to perspiring skin somewhat better than the conventional rubber-base pressure-sensitive adhesives and, generally, it being somewhat less painful to remove an article adhered therewith to the skin than one adhered with a conventional rubber-base adhesive composition. However, one of the disadvantages of acrylate adhesives is that it is extremely difficult to remove acrylate adhesive residues which may be left on the skin after the article which has been adhered to the skin through use of the adhesive has been removed. This is true both of small amounts of acrylate pressure-sensitive adhesive that may be left on the skin as well as acrylate adhesive cements. In both cases, it is generally necessary to use an organic solvent to remove the adhesive residue.

This problem of adhesive removal is particularly acute where the acrylate adhesive is of the cement type and the same is first applied to the skin and while the adhesive is still tacky, an absorbant pad or other dressing is then adhered thereto. In such instances on removal of the dressing, substantial quantities of the acrylate adhesive remain on the skin. It is then necessary to use an organic solvent, such for example, as acetone, ethyl acetate or methyl ethyl ketone to remove the same.

It is an object of the present invention to prepare acrylate adhesives both of the pressure-sensitive type and of the non-pressure-sensitive cement type, which can be removed by washing with water. It is a further object of the present invention to prepare acrylate adhesive compositions which have good skin adherence over extended periods of time and which can be removed from the skin by washing with water. It is a still further object of the present invention to make water-removable acrylate adhesive compositions which are soluble in organic solvents and can readily be spread in thin films from organic solvent solutions. Other objects and advantages of this invention will become apparent from the following description wherein are set forth by way of illustration and example certain embodiments of this invention.

It has now been discovered that acrylate adhesives that are water-soluble can be obtained by including in the acrylate adhesive polymer amine salts having the group designated by the general formula

where X is an acid anion. The active amine group

which forms the salt, should generally be present in amounts of at least 1.0% by weight of the total acrylate polymer in order to obtain water removability of the acrylate polymer adhesive. Where the active group

is present in amounts of much less than 1.0% by weight of the adhesive acrylate polymer the desirable characteristic sufficient water solubility to be water-removable will not be present after the salt is formed. With increasing amounts above 1.0% by weight of

the polymer salt becomes increasingly more readily removed by water and with polymers containing above 1.5% by weight of the group

when converted to salt form the polymer generally is completely water soluble. The amine containing monomer, however, should not be inculded in amounts such that the

groups are present in the final polymer, on a weight basis prior to salt conversion, much in excess of about 4.0 percent by weight as this tends to deleteriously affect the adhesive qualities of the product.

One of the surprising characteristics of the present invention is that the inclusion of such solubilizing groups while making the adhesive water-removable, does not apparently deleteriously affect the skin adherence of the adhesive composition. This is an important advantage of the particular acrylate adhesive compositions of the present invention, as perspiration occurs at the skin surface of a patient and the adhesive must be such that such perspiration does not remove the adhesive or so affect the adherent qualities of the adhesive that the adhesive no longer acts to bond the article applied by the same to the underlying surface skin.

The water-soluble polymers of the present invention are prepared through the polymerization of an ester of acrylic acid with an acrylate or methacrylate monomer containing at least one amine group. Some amine containing monomers of this general type, including their preparation, are described for example in U.S. Patent 2,744,884. The acrylate or methacrylate amine containing monomers found useful in practicing the present invention can be described by the general formula:

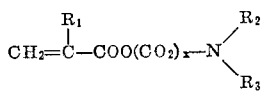

in which $R_1$ is H or $CH_3$,
$x$ is an integer of 2 to 12,
$R_2$ is H or an alkyl group of $C_1$ to $C_{12}$, and
$R_3$ is an alkyl group of $C_1$ to $C_{12}$.

The amine containing monomers may be polymerized with esters of acrylic acid alone or simultaneously with esters of acrylic acid and other acrylic monomers. Where acrylic esters are the only other monomer or monomers together with the amine containing monomer the acrylic ester should be present in amounts of at least 40% by weight on a solids basis. Esters of methacrylic acid may be substituted in part for the acrylic ester. The amount of methacrylate ester monomer should, however, not exceed more than 25% by weight of the total monomer mixture and should not be present in amounts in excess of the acrylate ester. Thus, if the amine containing monomer were 40% of the monomer mixture and the remaining monomers were esters of acrylic and methacrylic acid, the methacrylate ester monomer would not exceed 25% by weight of the total monomer mix. Where the total acrylate ester and methacrylate ester was the minimum amount of 40% by weight of the total monomer the acrylate ester should be present in amounts of at least 20% by weight.

The acrylate esters and the methacrylate esters found suitable are the esters of alkyl alcohols containing 4 to 12 carbon atoms. These esters can be represented by the general formula:

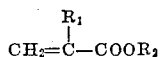

in which $R_1$ is H or $CH_3$ and $R_2$ is an alkyl chain of $C_4$ to $C_{12}$ carbon content.

Some examples of esters of acrylic acid and esters of methacrylic acid which may be used in practicing the present invention are the esters of these aids with alkyl alcohols such as n-butanol, isobutanol, n-pentanol, isopentanol, 2-methylbutanol, 1-methylbutanol, 1-methylpentanol, 2-methylpentanol, 3-methylpentanol, 2-ethylbutanol, pentanol-3,3,5,5-trimethylhexanol, heptanol-3, iso-octanol, n-decanol, n-dodecanol, n-heptanol, 2-ethylhexanol, n-hexanol, n-octanol, diisobutyl carbinol, 2,6,8-trimethyl-4-nonanol.

Other acrylic monomers may be added to modify the adhesive qualities if desired. Thus, for example, some of the preferred adhesives are obtained by including on a solids basis from 10 to 30% by weight N-tert.-butylacrylamide in the monomer mix in preparing the adhesive polymer as the inclusion of this monomer appears to improve the long term skin adherence of the resulting adhesive. However, the adhesive polymer should still contain the minimum amounts of acrylate ester and amine monomers heretofore mentioned polymerized together in the final adhesive polymer.

Although the present invention is primarily directed to water-removable acrylate adhesives, it is not limited thereto as skin adhering protective acrylate film dressings can be formed by applying to the skin organic solutions of film forming water-removable acrylate film formers. Where so used the organic solvent should preferably have a boiling point below about 75° C. so that it will evaporate from the skin surface to leave a protective acrylate film dressing. The skin adhering water-removable acrylate film in such case would act solely as a protective film dressing and need not be used to adhere to the underlying skin some object such, for example, as an absorbent dressing.

The acid ion X of the solubilizing group may be any acid ion capable of being attached either directly or indirectly to form the amine salt. The preferred acid ions are fluoride, chloride, bromide, iodide, sulfate and organic sulfonates. However, the invention is not limited to these and includes other acid anions such as nitrates, phosphates, and carboxylic anions such as acetates, propionates and benzoates.

Insofar as I am aware, any salt forming acid anion may be used. Where the adhesives of the present invention are to be used in contact with the human skin, an acid anion should be selected that is not skin irritating. Insofar as I am aware none of the anions specifically mentioned are skin irritating in the polymer salt form.

The solubilizing amine salts are incorporated into the polymer as previously indicated by using, as one of the reactive monomers, an acrylic monomer derived from either methacrylic acid or acrylic acid and containing at least one amine group. The monomer used may be an amine salt. However, in the preferred practice of the invention, the amine salts are not formed until after polymerization has been completed after which the acrylate polymer containing the amine groups is converted to the amine salt by neutralization with an acid, the ion of which is to be added.

Although any monomer containing amine groups having the general chemical structure previously set forth may be used in practicing the present invention, in specific examples given to describe the practice of the present invention the two preferred amine acrylate monomers, dimethylaminoethyl methacrylate and tert.-butylaminoethyl methacrylate, are used. The invention, however, is not limited to the use of these particular amine acrylate monomers and others, as previously indicated, may be employed.

It is apparently the presence, in the amine acrylate copolymer adhesives, of the amine salt that causes the solubilizing of the acrylate adhesive to the point where it can be removed from the skin or other surface by washing. Acrylate adhesive copolymers containing amine groups without conversion to the salt form are found to be just as insoluble in water as copolymer acrylate adhesives which do not contain the amine groups. However, after the salts are formed by incorporating the acid ion into the amine group, the acrylate adhesives are solubilized to the extent that they can be readily removed from the skin by washing with water. This solubilizing effect, however, apparently only occurs where the solubilizing group

forming the salt is present in at least the minimum amounts previously indicated. Thus, for example, where the amine acrylate is dimethylaminoethyl methacrylate hydrochloride or tert.-butylaminoethyl methacrylate hydrochloride, the same should be present in amounts of about at least 15% in order to obtain the solubilizing effect which makes the adhesives water-removable. (15% dimethylaminoethyl methacrylate hydrochloride is equivalent to 1.2% of

group and 15% tert.-butylaminoethyl methacrylate hydrochloride is equivalent to 1.0% of

group). This effect on solubility is well illustrated by the following table:

AMINE-CONTAINING ACRYLATE POLYMERS

| Polymer Composition, wt., percent [1] | | | | | | | Rel. Vis. of Free Base [2] | Neut. Equiv. of Free Base [3] | Water Solubility of Salt [4] | | |
|---|---|---|---|---|---|---|---|---|---|---|---|
| EHA | LMA | BA | LA | BACA | DMEAMA | TBAEMA | | | Hydrochloride | Sulfate | p-Toluene Sulfonate |
| 45 | 25 |  |  | 30 |  |  | 1.28 | 492 | Soluble |  |  |
|  |  |  | 75 |  |  | 25 | 1.32 | 752 | do |  |  |
|  |  | 42 |  | 28 |  | 30 | 1.41 | — |  |  |  |
|  |  | 42 |  | 28 | 30 |  | 1.35 | — |  |  |  |
|  |  | 42 |  | 28 |  | 30 | 1.50 | 580 | Soluble |  |  |
|  |  | 42 |  | 28 | 30 |  | 1.39 | 500 | do |  |  |
|  |  | 70 |  |  |  | 30 | 1.50 | 545 | do |  |  |
|  |  | 70 |  |  | 30 |  | 1.44 | 454 | do |  |  |
|  |  | 80 |  |  | 20 |  | 1.48 | 732 | do |  |  |
| 80 |  |  |  |  | 20 |  | 1.29 | 662 | Part soluble |  |  |
| 80 |  |  |  | 10 | 10 |  | 1.39 | 1,518 | Insoluble |  |  |
| 70 |  |  |  | 20 | 10 |  | 1.47 | 1,528 | do |  |  |
| 80 |  |  |  | 5 | 15 |  | 1.33 | 1,017 | Part soluble |  |  |
| 70 |  |  |  | 15 | 15 |  | 1.40 | 967 | do |  |  |
| 70 |  |  |  | 10 | 20 |  | 1.35 | 709 | Soluble |  |  |
| 65 |  |  |  | 10 | 25 |  | 1.33 | 600 | do |  |  |
| 90 |  |  |  |  | 10 |  | 1.30 | 1,535 | Insoluble |  |  |
| 85 |  |  |  |  | 15 |  | 1.28 | 991 | Part soluble |  |  |
| 80 |  |  |  |  | 20 |  | 1.27 | 754 | Soluble |  |  |
| 75 |  |  |  |  | 25 |  | 1.26 | 581 | do |  |  |
| 70 |  |  |  |  | 30 |  | 1.28 | 488 | do |  |  |
| 75 |  |  |  | 10 | 15 |  | 1.31 | 1,042 | Part soluble |  | Part soluble. |
| 70 |  |  |  | 10 | 20 |  | 1.30 | 786 | Soluble | Slow solubility | Soluble. |
| 65 |  |  |  | 10 | 25 |  | 1.29 | 627 | Fast solubility | Fast solubility | Fast solubility. |
| 60 |  |  |  | 10 | 30 |  | 1.28 | 513 | Very fast sol | Very fast sol | Very fast sol. |
| 50 |  |  |  | 10 | 40 |  | 1.30 | 379 | do | do | Do. |

[1] EHA=2-ethylhexyl acrylate; LMA=lauryl methacrylate; BA=butyl acrylate; LA=lauryl acrylate; BACA=N-tert.-butylacrylamide; DMEAMA=dimethylaminoethyl methacrylate; TBAEMA=tert.-butylaminoethyl methacrylate.
[2] At a concentration of 1.000 g./100 ml. in toluene at 30° C.
[3] By potentiometric titration in 50-50 benzene-ethanol using 0.1 N ethanolic hydrochloric acid.
[4] At a concentration of 0.2 percent in water. Soluble refers to complete solubility at this concentration.

Although the lower limit with respect to the weight percent of the salt forming group

is important with respect to getting acrylate adhesives which are water-removable, surprisingly there appears to be no critical upper limit with respect to making the polymer adhesives so water-soluble as not to adhere to a skin surface. This is an important advantage where the adhesive is designed for application to the skin. As amounts of the activating group

substantially in excess of the initial amount needed to solubilize the acrylate polymer adhesive may be used without appreciably deleteriously affecting the skin adhesion even over extended periods of wear despite the fact that the skin surface may become moist through perspiration. However, as previously indicated, the adhesive characteristics, other than water solubility, are deleteriously affected by incorporating too much of the amine containing monomer and accordingly it should not exceed more than about 50% by weight of the total polymer prior to conversion to salt form. This is equivalent to about 4.0% by weight of the active amine group

The following examples, given for the purpose of illustration only, will help to further illustrate the practice of the present invention.

*Example I*

A pressure-sensitive adhesive acrylate copolymer is prepared by copolymerizing 20 parts by weight dimethylaminoethyl methacrylate monomer with 80 parts by weight 2-ethylhexyl acrylate in ethyl acetate solvent at 75–80° C. at a monomer concentration of 50%. α,α'-azobisisobutyronitrile is used as the initiator. The initiator is used at a concentration of 0.25% based on the monomer. The reaction proceeds for a period of 4 hours. The polymer batch is neutralized in the ethyl acetate reaction mixture with 2.0 N ethanolic hydrochloric acid. After neutralization, the polymer solution is spread on silicone-coated paper, dried, and transferred to a rayon fabric backing. The polymer is found to readily dissolve in water (0.2 gram in 100 ml.) to give a turbid solution. Also, polymer permitted to dry on human skin is readily removed by gently rubbing with a wet cloth. Skin adherence of 2″ x 2″ patches of tape so formed are evaluated in wear tests of 48 hours on the backs of subjects. Adherence is satisfactory, and irritation level is very low.

*Example II*

A pressure-sensitive adhesive acrylate copolymer is prepared by copolymerizing 20 parts by weight dimethylaminoethyl methacrylate monomer with 75 parts by weight 2-ethylhexyl acrylate and 5 parts by weight N-tert.-butylacrylamide. Polymerization is carried out in the manner described in Example I using the same initiator, and the resulting pressure-sensitive adhesive polymer subjected to the same tests, the polymer being neutralized by treating with 2.0 N ethanolic hydrochloric acid in the same manner as described in Example I. The resulting pressure-sensitive adhesive is found to be water-soluble and removable and to give satisfactory wear tests and also have a very low irritation factor.

*Example III*

A non-pressure-sensitive adhesive acrylate is formed by copolymerizing 80 parts by weight of n-butyl acrylate with 20 parts by weight of dimethylaminoethyl methacrylate monomer in ethyl acetate solvent at monomer concentrations of 50% and at a temperature of 75–80° C. α,α'-Azobisisobutyronitrile is used as the initiator at a concentration of 0.2% of the monomer.

After polymerization, the monomer is neutralized while in the original ethyl acetate reaction mixture with 2.0 N ethanolic hydrochloric acid. Solvent is adjusted to give a polymer solution containing about 30% solids. A skin area is then coated with a small amount of this solution and while still tacky a gauze dressing is applied. The adhesive cement holds the gauze dressing firmly in place until it is desired to remove the same, at which time it can be readily peeled off in much the same manner as though it were applied by a pressure-sensitive adhesive. The adhesive cement then remaining on the skin is readily removed by washing in water. The polymer adhesive contains 1.6% by weight of the salt forming group

After neutralization, some of the polymer acrylate adhesive is dried. The dried polymer readily dissolves in water (0.2 gram in 100 ml.) to give a turbid solution.

*Example IV*

An adhesive cement similar to that of Example III in skin adhering properties, water removability, and ability to hold dressings to a skin surface, is prepared by copolymerizing 75 parts by weight of 2-ethylhexyl acrylate and 25 parts by weight of dimethylaminoethyl methacrylate monomer and then converting to the hydrochloride salt in the manner described in Example III.

*Example V*

An adhesive acrylate cement which is skin adherent and removable by water is prepared by reacting the monomers n-butyl acrylate and N-tert.-butylaminoethyl methacrylate in the manner described and then converting the same to the hydrochloride.

*Example VI*

An adhesive skin-adherent terpolymer acrylate cement is prepared by copolymerizing 42% by weight n-butyl acrylate, 28% by weight N-tert.-butylacrylamide, and 30% by weight tert.-butylaminoethyl methacrylate monomers in the manner described in preparing the copolymer of Example III. The resulting copolymer is then converted to the hydrochloride salt in the manner described, for example, in Example III. The resulting terpolymer adhesive is readily soluble in water, removable by washing with water, and has excellent skin adherence for cementing on dressings and the like.

*Example VII*

A terpolymer acrylate adhesive cement which is water-soluble and has good skin adherence properties is prepared by copolymerizing the monomers 2-ethylhexyl acrylate, N-tert.-butylacrylamide and dimethylaminoethyl methyacrylate in the amounts respectively of 70, 10 and 20 parts by weight of each. The polymerization is carried out in the manner described in Example III and the polymer then converted to the hydrochloride salt in the manner described.

The acrylate adhesives of the present invention have the interesting property that they are both soluble in organic solvents as well as being sufficiently soluble in water to permit the ready removal of the same by water washing. The solubility in organic solvents permits the ready handling of the adhesives, for example, in the manufacture of pressure-sensitive adhesives where the same can be spread from the solvent in which they are formed. Where the adhesive is a non-pressure-sensitive adhesive, such as an acrylate cement adhesive, the same is applied either to the skin or the dressing from an organic solvent solution. This may be done by either spraying or painting the adhesive on the area to be covered. After the adhesive has served its purpose and it is desired to remove the same, it can then be removed by washing with water without the need of special solvents.

Particular embodiments of the invention have been used to illustrate the same. The invention, however, is not limited to these specific embodiments. In view of the foregoing disclosure, variations or modifications thereof will be apparent, and it is intended to include within the invention all such variations and modifications except as do not come within the scope of the appended claims.

Having thus described my invention, I claim:

1. An adhesive composition comprising an adhesive acrylate linear polymer amine salt containing in interpolymerized form an acrylic ester of the group acrylate esters and methacrylate esters of the general structure:

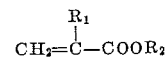

wherein
   $R_1$ is H or $CH_3$
   $R_2$ is an alkyl chain of 4 to 12 carbons
and an acrylic amine of the general structure:

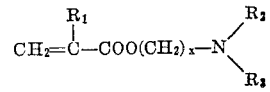

wherein
   $R_1$ is H or $CH_3$
   $x$ is an integer of 2 to 12
   $R_2$ is H or an alkyl group of 1 to 12 carbons
   $R_2$ is an alkyl chain of 4 to 12 carbons
the acrylic amine derived component of said polymer containing 1.0 to 4.0% by weight of radical

said radical being present in the salt form

where X is an anion of an acid and said acrylic ester derived component of said polymer being present in an amount of at least 40% by weight of said acrylate linear polymer amine salt on a nonsalt basis the methacrylate derived portion of said polymer not exceeding 25% by weight of said polymer on a nonsalt basis and not exceeding one-half of the total acrylic ester derived portion.

2. An adhesive composition of claim 1 in which X is an anion of the group consisting of halides, sulfate and organic sulfonates.

3. An adhesive composition of claim 2 in which the anion of said group is a halide.

4. An adhesive composition of claim 3 in which the anion of said group is chloride.

5. An adhesive composition of claim 2 in which the anion of said group is sulfate.

6. An adhesive composition of claim 2 in which the anion of said group is an organic sulfonate.

7. An adhesive composition of claim 1 in which said acrylate linear polymer amine salt contains on a non-salt basis 10 to 30% by weight of interpolymerized N-tert.-butylacrylamide.

8. An adhesive composition of claim 1 in which the radical

is present in amounts of at least 1.5% by weight.

9. An adhesive composition of claim 1 in which the acrylic amine is at least one of the group consisting of dimethylaminoethyl methacrylate and tert.-butylaminoethyl methacrylate.

10. An adhesive composition of claim 9 in which the acrylate ester is of the group consisting of 2-ethylhexyl acrylate, butyl acrylate and lauryl acrylate.

11. An adhesive composition of claim 10 in which said acrylate linear polymer amine salt contains on a non-salt basis 10 to 30% by weight of interpolymerized N-tert.-butylacrylamide.

12. An adhesive composition of claim 10 in which X is an anion of the group consisting of halides, sulfates and organic sulfonates.

13. An adhesive composition of claim 12 in which the anion X is a halide.

14. An adhesive composition of claim 12 in which the anion X is chloride.

15. An adhesive composition of claim 12 in which the anion X is a sulfate.

16. An adhesive composition of claim 12 in which the anion X is an organic sulfonate.

17. An adhesive composition of claim 12 in which the acrylic amine is dimethylaminoethyl methacrylate and the radical

is present in an amount of at least 1.5% by weight.

18. An adhesive composition of claim 12 in which the acrylic amine is tert.-butylaminoethyl methacrylate and the radical

is present in an amount of at least 1.5% by weight.

19. An adhesive composition of claim 10 in which the radical

is present in an amount of at least 1.5% by weight.

20. An adhesive composition of claim 19 in which X is an anion of the group consisting of halides, sulfates and organic sulfonates.

References Cited by the Examiner
UNITED STATES PATENTS

| | | | |
|---|---|---|---|
| 2,744,884 | 5/1956 | Benneville | 260—78.5 |
| 3,226,373 | 12/1965 | Fareri et al. | 260—86.1 |

JOSEPH L. SCHOFER, *Primary Examiner.*

D. K. DENENBERG, *Assistant Examiner.*